United States Patent
Weser

(10) Patent No.: US 6,693,423 B2
(45) Date of Patent: Feb. 17, 2004

(54) ARRANGEMENT FOR ANGULAR MEASUREMENT

(75) Inventor: Marcus Weser, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/095,399

(22) Filed: Mar. 11, 2002

(65) Prior Publication Data

US 2002/0180428 A1 Dec. 5, 2002

(30) Foreign Application Priority Data

Mar. 13, 2001 (DE) .......................... 101 12 352

(51) Int. Cl.⁷ .................. G01B 7/30; G06F 15/00
(52) U.S. Cl. .................... 324/207.25; 324/207.12; 324/207.2; 324/207.21; 702/151
(58) Field of Search .................. 324/207.2, 207.21, 324/207.22, 207.25, 224, 225, 202, 207.12; 73/1.75; 702/94, 151, 130; 33/1 PT

(56) References Cited

U.S. PATENT DOCUMENTS

| | | | | |
|---|---|---|---|---|
| 6,304,074 B1 | * | 10/2001 | Waffenschmidt | 324/202 |
| 6,418,388 B1 | * | 7/2002 | Dietmayer | 702/95 |
| 6,424,147 B1 | * | 7/2002 | Kato et al. | 324/207.2 |
| 6,448,763 B1 | * | 9/2002 | Spellman | 324/207.21 |
| 6,456,063 B1 | * | 9/2002 | Moreno et al. | 324/207.12 |
| 6,492,804 B2 | * | 12/2002 | Tsuge et al. | 324/166 |
| 6,498,479 B1 | * | 12/2002 | Hamaoka et al. | 324/207.2 |
| 2001/0056333 A1 | * | 12/2001 | Dietmayer | 702/130 |

FOREIGN PATENT DOCUMENTS

| | | | | |
|---|---|---|---|---|
| DE | 19757196 A1 | * | 6/1999 | G01B/7/00 |
| DE | 19849910 A1 | * | 5/2000 | G01B/7/30 |

* cited by examiner

Primary Examiner—N. Le
Assistant Examiner—Darrell Kinder
(74) Attorney, Agent, or Firm—Steven R. Biren

(57) ABSTRACT

An arrangement for angular measurement includes an angle sensor that supplies sensor signals phase shifted 90° with respect to each other and having actual amplitude values. A signal-processing device provides expected amplitude values of the sensor signals and graded limit values for a deviation between the expected amplitude values and the actual amplitude values of the sensor signals; compares the expected amplitude values with the actual amplitude values of the sensor signals; determines a deviation between the expected amplitude values and the actual amplitude values, and a range of values in which the determined deviation occurs; and generates an error signal including reliability class information about the range of values in which the determined deviation occurs. As a result, monitoring and evaluation of the measured sensor signals with accuracy and reliability is possible.

20 Claims, 1 Drawing Sheet

ARRANGEMENT FOR ANGULAR MEASUREMENT

BACKGROUND OF THE INVENTION

1. Field of the Invention

The invention relates to an arrangement for angular measurement.

2. Description of the Related Art

Known arrangements for angular measurements, also referred to as angle measuring systems, use, inter alia, the magnetoresistive effect, i.e. a change of the electric resistance in dependence upon the field strength of an external magnetic field. Typical sensors of this type are, for example, the sensors referred to as "KMZ 41" of Philips Semiconductors.

These sensors supply output signals which are sinusoidal as regards the angle of rotation and are electrically phase shifted by 90° with respect to one another. The signals may be considered as real and imaginary parts of a complex number so that determination of the angle by means of the arc tg function is possible. The angle is determined by means of an algorithm known by the name of "CORDIC" in angular measuring systems which are currently on the market and consist of, for example, a combination of sensors marketed as "KMZ 41" by Philips Semiconductors with an integrated electronic circuit comprising a signal-processing device also marketed by Philips Semiconductors as UZZ900x.

A sensor arrangement with a measuring error recognition feature is known from EP 0 927 868 A2, which comprises two sensors and one evaluation unit for determining a measuring signal from two sensor signals supplied by one sensor each. Such a sensor arrangement comprises, for example, two angle sensors and measures the angular position of a measuring object with respect to the sensor arrangement. To be able to determine errors occurring in such a sensor arrangement, particularly at the input of the evaluation unit during conversion of the sensor signals into A/D transducer units, the teaching of EP 0 927 868 A2 provides switching means for switching between two switching states in such a way that a sensor signal is applied in each switching state to the AID transducer units, the assignment of the sensor signals to the A/D transducer units in the two switching states is different, and the evaluation unit is formed for determining an error signal from two measuring signals found during each switching state.

DE 198 49 910 A1 discloses an offset-compensated angle measuring system. In the arrangement described in this document and used for measuring an angle between a magnetic field and a MR sensor, which supplies at least two 90° phase-shifted electric sensor signals which are supplied to an A/D converter preceding an angle computing arrangement, the sensor signal value of the two sensor signals is determined in accordance with a predetermined formula from which the change of the sensor signal value is determined in dependence upon the computed angle and, in dependence upon this change of the value, an offset control of the sensor signals is performed, all this for automatic and continuous offset compensation of the static and dynamic offsets in an arrangement for computing the value.

German patent application 100 22 175.0 of Jun. 05, 2000 describes an arrangement for angular measurements, comprising an angle sensor supplying two mutually 90° phase-shifted sensor signals whose amplitudes are dependent on the temperature. To provide the possibility of monitoring the flawless operation of the arrangement, the teaching of this application provides a temperature sensor and a microprocessor in the arrangement described in this document. In dependence upon a temperature value supplied by the temperature sensor, the microprocessor computes expected amplitude values of the sensor signals, compares these values with the actual amplitude values of the sensor signals, and generates an error signal when the deviation between the expected and the actual amplitude values exceeds a predetermined limit value.

In the arrangement described in German patent application 100 22 175.0, the amplitude values of the sensor signals vary due to the manufacture and type of the sensor element used, for example, the sensor types "KMZ 41" or "KMZ 43" marketed by Philips Semiconductors. Moreover, there is a significant temperature dependence on the amplitude values of the sensor signals, which is to be limited with the aid of the temperature sensor. For this reason, the range of tolerances defined by the predetermined limit value in accordance with the teaching of German patent application 100 22 175.0, i.e. the admissible deviation between the expected and actual amplitude values of the sensor signals, must be maintained within a wide range.

The arrangements described have the drawback that only serious error conditions, such as the loss of the sensor magnet or breakage of electric connections, are recognized by the diagnosis methods used by these arrangements. A supplementary evaluation of the measured sensor signals as regards their accuracy and reliability is not possible with the arrangements described hereinbefore.

BRIEF SUMMARY OF THE INVENTION

It is an object of the invention to provide an arrangement for angular measurement with which monitoring and evaluation of the measured sensor signals as regards their accuracy and reliability is possible.

According to the invention, this object is solved by an arrangement for angle measurement, comprising an angle sensor for supplying two sensor signals which are 90° phase shifted with respect to each other and have actual amplitude values, and a signal-processing device for computing and/or making available expected amplitude values of the sensor signals in dependence upon predetermined and/or measured values of selected circuit and/or operation parameters of the arrangement for angular measurement, computing and/or making available a plurality of graded limit values for a deviation between the expected amplitude values and the actual amplitude values of the sensor signals, by which graded limit values a plurality of ranges of values is fixed for said deviation, comparing the expected amplitude values with the actual amplitude values of the sensor signals, determining the deviation between the expected amplitude values and the actual amplitude values, and determining the range of values in which the determined deviation occurs, and generating an error signal comprising reliability class information about the range of values in which the determined deviation between the expected amplitude values and the actual amplitude values of the sensor signals occurs.

Due to the measures according to the invention, the measured sensor signals can be monitored and evaluated as regards their accuracy and reliability in a simple and reliable way. In addition to the measuring error recognition disclosed by the known documents, an arrangement for angular measurement with an efficient diagnosis function is provided. The output signal is not only examined for extreme error conditions but also for small deviations. The result of the computation of the angle from the measured sensor signals, performed in the signal-processing device, is evaluated. This evaluation is expressed by the error signal and may be utilized for a reliability test when further processing an angle signal assigned to the angle computed from the sensor signals.

A high solution of recognizable deviations between the expected amplitude values and the actual amplitude values can then be achieved. A further requirement with a view to angular measuring systems of the type described can be satisfied in this way. Requirements such as increasing reliability of operation and improving the self-monitoring function of the angular measuring system can thus be met in a simple way.

In an advantageous further embodiment of the arrangement according to the invention, an individually digitally encoded bit code in the error signal is assigned to the reliability class information in accordance with the range of values in which the deviation between the expected amplitude values and the actual amplitude values of the sensor signals occurs. The condition for a reliable, digital evaluation of the reliability class information is thereby achieved.

A further embodiment of the invention is characterized in that a CORDIC algorithm is used in the signal-processing device for computing an angle from the sensor signals, and the radius determination provided by this CORDIC algorithm anyway is utilized for determining the actual amplitude values of the sensor signals. This provides the possibility of a very simple and low-cost realization of the invention in existing angular measuring systems.

In accordance with a further embodiment of the invention, the signal-processing device is adapted to generate an angle signal assigned to the angle computed from the sensor signals, and the error signal is supplied together with the angle signal by the signal-processing device, so that a simple and directly common further processing and evaluation is possible.

The arrangement according to the invention preferably comprises a control apparatus receiving the angle signal and the error signal and being adapted to perform different functions in dependence upon the reliability class information comprised in the error signal. Particularly, different control program runs can be realized in dependence upon the contents of the reliability class information, taking into account the value of the deviation between the expected amplitude values and the actual amplitude values.

A temperature signal representing a measured temperature value, but also a signal representing a characteristic of the angle sensor may be preferably used as selected circuit and/or operation parameters of the arrangement for angular measurement. To this end, the arrangement according to the invention may particularly comprise a temperature sensor for measuring a temperature value and for making available the temperature signal representing the measured temperature value. This temperature sensor is preferably used for measuring the temperature of the angle sensor, but other temperature influences by other parts of the angular measuring system can be compensated in the same way. Alternatively, by providing characteristics of the angle sensors used, the signal-processing device may also be put into a position in which the limit values and hence the ranges of values determined thereby for the deviation found between the expected amplitude values and the actual amplitude values of the sensor signals can be exactly adapted to the respective angle sensors. Influences of type-dependent differences of the characteristics of the angle sensors used, or even individual spreads of the characteristics of the type of angle sensor used can be at least substantially completely eliminated in this way, so that the generated error signals represent an exact copy of errors actually occurring in the angular measuring system.

The signal-processing device and/or the control apparatus are advantageously adapted for a plausibility test of the sensor signals supplied by the angle sensor, which test is performed on the basis of the reliability class information. The reliability of the measured sensor signals can thereby be graded, which may play a role in their further evaluation.

These and other aspects of the invention are apparent from and will be elucidated with reference to the embodiments described hereinafter.

DETAILED DESCRIPTION OF THE INVENTION

Figure 1:
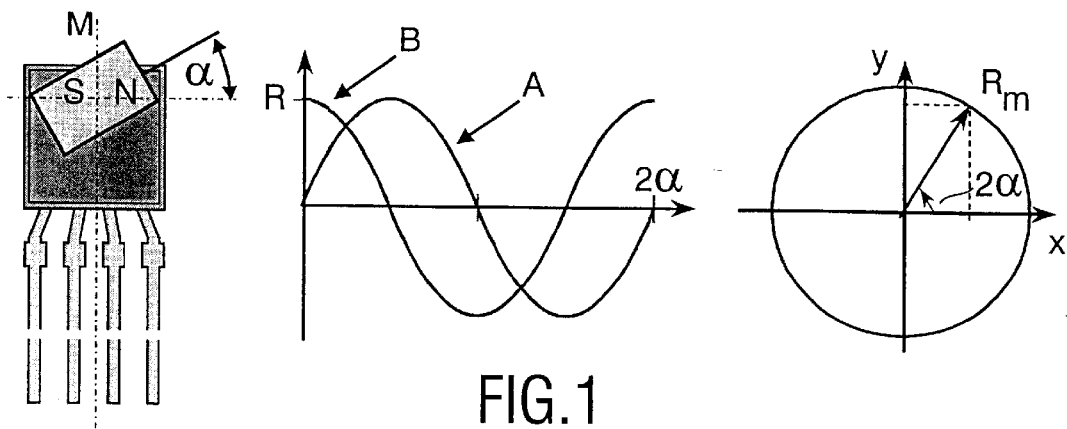
FIG. 1 shows three diagrams of the principle of an angle sensor.

The left-hand part of FIG. 1 shows, in a coarse diagram, an angle sensor with a rotatable magnet M whose north pole is denoted by N and south pole is denoted by S. The angle of rotation of the magnet M with respect to the sensor is denoted by $\alpha$.

The central part of FIG. 1 shows diagrammatically a graph of two electric sensor signals A and B which are 90° phase shifted with respect to each other, plotted on twice the angle of rotation $\alpha$ and representing a measure of the variation of the electric resistance R of the angle sensor in dependence upon the magnetic field of the magnet M.

The 90° phase-shifted sensor signals A and B may be considered to be the real part x (also referred to as cosine signal; here the sensor signal B) and the imaginary part y (also referred to as sine signal; here the sensor signal A) of a complex number, constituting a vector Rm (also referred to as "pointer in the complex plane") with the Euler relation in the complex plane, representing the measured value Rm of the electric resistance R of the angle sensor in dependence upon the magnetic field of the magnet M. The (mechanical) angle $\alpha$ can be determined by means of the arc tg function. In the current angular measuring systems (consisting of, for example, the components of the types "KMZ 41" and "UZZ900x" marketed by Philips Semiconductors, this is effected by means of the "CORDIC" algorithm with which also the amount of the measured value Rm of the electric resistance R of the angle sensor is determined. The length of the vector Rm in the complex plane, i.e. its value, is independent of the measured mechanical angle $\alpha$.

In a further embodiment of this arrangement and this method, the length, i.e. the value, of the vector Rm of the measured value of the electric resistance R of the angle sensor, as obtained from the computation with the CORDIC algorithm, may be tested on its plausibility. A range of values for the value of the vector Rm can be defined, within which a flawless operation of the angle sensor and the overall angular measuring system is assumed. This range of values is shown diagrammatically in FIG. 2, where it is denoted by the reference numeral 2. It is also referred to as "Safe Operation Area" (SOA) or as ΔR range. A relevant description can be found in German patent application 100 22 175.0. The "SOA" is computed by means of a microprocessor, using a temperature value measured on the angle sensor. When the actual amplitude values of the sensor signals A and B and hence the vector Rm are within the expected range of values 2, the measurement does not show an error. The sensor signals A and B are plausible.

Figure 2:
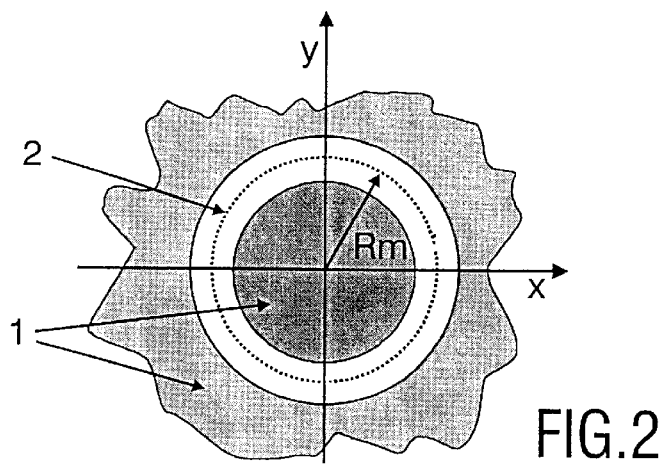
FIG. 2 shows diagrammatically a plausibility test of the sensor signals supplied by the angle sensor of FIG. 1.

However, when, in contrast, the vector Rm is within the range 1 situated outside the range of values 2, which range 1 is shaded in FIG. 2, then this means an inadmissible deviation of at least one of the sensor signals A and B and hence the value of the vector Rm. The deviation between the expected amplitude values and the actual amplitude values of the sensor signals A and B exceeds the limit values given by the boundaries of the range of values 2, and the measured values of the vector Rm and hence of the sensor signals A and B is graded as being "not plausible".

For example, in the case of failure of the magnet M, the amplitude of the sensor signals A and B is approximately zero. The vector Rm is then outside the range of values 2 and the error condition is recognized.

In angular measuring systems of the type described hereinbefore, the actual amplitude values of the sensor signals A and B vary due to manufacture and type of angle sensors such as, for example, marketed as "KMZ 41" or "KMZ 43" by Philips Semiconductors. Additionally, there is the already mentioned dependence of the actual amplitude values of the sensor signals A and B on the temperature, which is to be limited by means of the arrangement comprising a temperature sensor as described in German patent application 100 22 175.0.

For this reason, only a range of values 2 (i.e. a "SOA" or a ΔR range) is defined in German patent application 100 22 175.0. Due to tolerances occurring, this range of values 2 is maintained within wide limits.

The major drawback is that only large error conditions, such as loss of the magnet M or breakage of electric connections can be recognized by means of this diagnosis method. A more accurate evaluation of the currently measured angle signal as regards accuracy is not possible with the teachings of German patent application 100 22 175.0.

A high solution of recognizable deviations represents a further requirement for the angular measuring system. This is due to requirements such as reliability and self-monitoring.

The fundamental aspect of the present invention is to divide the range of "SOA" by a number (plurality) of graded limit values in different ranges, here also referred to as "stages". The respective maximal deviations between the amount |Re| of the vector Re of the expected value of the electric resistance R of the angle sensor, resulting from the expected amplitude values of the sensor signals A and B, and the amount |Rm| of the vector Rm of the actually measured value of the electric resistance R of the angle sensor are fixed in accordance with the following criteria in an embodiment shown diagrammatically in FIG. 3:

"stage 0": |Rm|-|Re| > 40% * |Re|, defined by limit values G3
"stage 1": |Rm|-|Re| < 40% * |Re|, defined by limit values G3

-continued

"stage 2": |Rm|-|Re| < 20% * |Re|, defined by limit values G2
"stage 3": |Rm|-|Re| < 5% * |Re|, defined by limit values G1.

Figure 3:
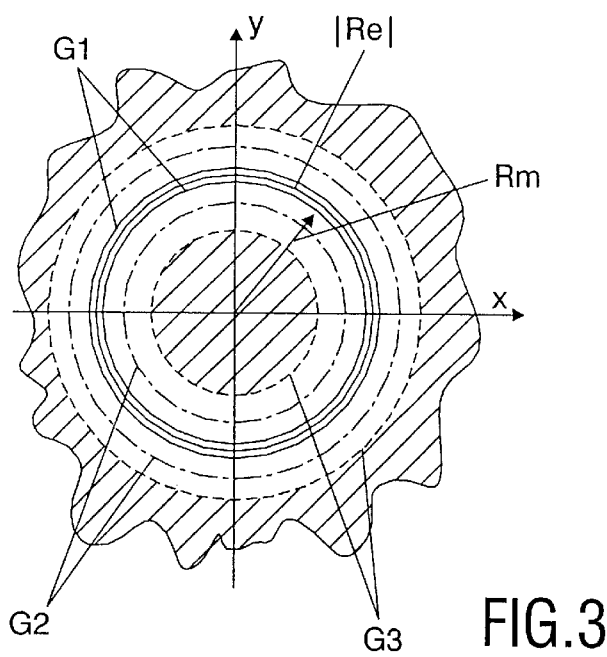
FIG. 3 shows diagrammatically, by way of example, a range of values formed in accordance with the invention for the deviation between the expected amplitude values and the actual amplitude values of the sensor signals.

In FIG. 3, these "stages" are defined by limit values G1, G2 and G3 of a constant value of the vector of the electric resistance R of the angle sensor, appearing as circles in the diagram. The circular areas bounded by these circles constitute the individual ranges of values of the "stages", defined by the limit values G1, G2, G3.

The use of narrower and different stages ("SOA" ranges) is then possible.

During the signal flow, each actual measured value is compared with the value of the vector Re, i.e. the expected vector length |Re|. The resultant deviation is assigned to one of the "stages". Each measured value or each group of measured values is thus evaluated. For example, in the case of deviations of more than 40% of the value |Re|, the measured value is evaluated in "stage 0". This stage comprises major errors such as loss of the magnet and contact errors.

Also small deviations are registered by means of this method according to the invention and evaluated with a "stage". Small deviations may be caused, for example, by additionally occurring offsets ("DC drift").

By virtue of the invention, the efficiency of a diagnosis function is advantageously improved by "SOA" evaluation facilities yielding more powerful results. The output signal of the angular measuring system is not only tested on extreme error conditions but also on small deviations. The measuring result of the angle is evaluated.

The reliability (classified in accordance with the "stage" of the measured value) of the measuring value is indicated in the output signal of the angular measuring system. In the case of a digital output signal, a given bit code is assigned to each stage. The bit code is supplied together with the measuring signal.

When a control apparatus is connected to the angular measuring system, it does not only receive angle information but also information about the evaluation of the signal. Dependent on the "stage", i.e. the error conditions and inaccuracies in the angular indications, the control apparatus may perform different programs.

The "stages" ("SOA" ranges), which are programmable in accordance with the invention, provide the possibility of testing the plausibility of signals supplied by the angle sensor, for example, of the type "KMZ 41". Since this is effected digitally, the smallest deviations in the signal processing itself are also detected, for example, error conditions in a subsequent signal amplification and A/D conversion (also referred to as "Input Diagnosis").

What is claimed is:

1. An arrangement for angular measurement, comprising an angle sensor for supplying two sensor signals which are 90° phase shifted with respect to each other and have actual amplitude values, and
a signal-processing device for
computing and/or making available expected amplitude values of the sensor signals in dependence upon predetermined an or measured values of selected circuit and/or operation parameter of the arrangement for angular measurement,
computing and/or making available a plurality of graded limit values for a deviation between the expected amplitude values and the actual amplitude values of the sensor signals, by which graded limit values a plurality of ranges of values is fixed for said deviation, comparing the expected amplitude values with the actual amplitude values of the sensor signals, determining the deviation between the expected amplitude values and the actual amplitude values, and determining the range of values in which the determined deviation occurs, and generating an error signal comprising reliability class information about the range of values in which the determined deviation between the expected amplitude values and the actual amplitude values of the sensor signals occurs.

2. An arrangement for angular measurement as claimed in claim 1, characterized in that an individually digitally encoded bit code in the error signal is assigned to the reliability class information in accordance with the range of values in which the deviation between the expected amplitude values and the actual amplitude values of the sensor signals occurs.

3. An arrangement for angular measurement as claimed in claim 1, characterized in that a CORDIC algorithm is used in the signal-processing device for computing an angle from the sensor signals, and the radius determination provided by this CORDIC algorithm is utilized for determining the actual amplitude values of the sensor signals.

4. An arrangement for angular measurement as claimed in claim 3, characterized in that the signal-processing device is adapted to generate an angle signal assigned to the angle computed from the sensor signals, and the error signal is supplied together with the angle signal by the signal-processing device.

5. An arrangement for angular measurement as claimed in claim 4, characterized by a control apparatus receiving the angle signal and the error signal and being adapted to perform different functions in dependence upon the reliability class information comprised in the error signal.

6. An arrangement for angular measurement as claimed in claim 1, characterized in that a temperature signal representing a measured temperature value is utilized as a selected circuit and/or operation parameter of the arrangement for angular measurement.

7. An arrangement for angular measurement as claimed in claim 1, characterized by a temperature sensor for measuring a temperature value and for making available the temperature signal representing the measured temperature value.

8. An arrangement for angular measurement as claimed in claim 1, characterized in that a characteristic of the signal representing the angle sensor is utilized as a selected circuit and/or operation parameter of the arrangement for angular measurement.

9. An arrangement for angular measurement as claimed in claim 8, characterized in that the signal-processing device and/or the control apparatus is implemented for a plausibility test of the sensor signals supplied by the angle sensor and performed on the basis of the reliability class information.

10. An arrangement for angular measurement, comprising:

an angle sensor that supplies sensor signals phase shifted 90° with respect to each other and having actual amplitude values; and a signal-processing device that provides expected amplitude values of the sensor signals, provides a plurality of graded limit values for a deviation between the expected amplitude values and the actual amplitude values of the sensor signals, compares the expected amplitude values with the actual amplitude values of the sensor signals, determines a deviation between the expected amplitude values and the actual amplitude values and determines a range of values in which the determined deviation occurs, and generates an error signal including reliability class information about the range of values in which the determined deviation between the expected amplitude values and the actual amplitude values of the sensor signals occurs.

11. An arrangement for angular measurement as claimed in claim 10, wherein an individually digitally encoded bit code in the error signal is assigned to the reliability class information in accordance with the range of values in which the deviation between the expected amplitude values and the actual amplitude values of the sensor signals occurs.

12. An arrangement for angular measurement as claimed in claim 10, wherein a CORDIC algorithm is used by the signal-processing device to compute an angle from the sensor signals, and a radius determination provided by the CORDIC algorithm is utilized for determining the actual amplitude values of the sensor signals.

13. An arrangement for angular measurement as claimed in claim 12, wherein the signal-processing device generates an angle signal assigned to the angle computed from the sensor signals, and the error signal is provided together with the angle signal by the signal-processing device.

14. An arrangement for angular measurement as claimed in claim 13, further comprising a control apparatus that receives the angle signal and the error signal, and that performs different functions depending upon the reliability class information included in the error signal.

15. An arrangement for angular measurement as claimed in claim 10, wherein the signal-processing device provides the expected amplitude values based on predetermined or measured values of circuit or operation parameters of the arrangement for angular measurement.

16. An arrangement for angular measurement as claimed in claim 10, wherein a temperature signal representing a measured temperature value is used by the signal processing device as the predetermined or measured valves.

17. An arrangement for angular measurement as claimed in claim 10, further comprising a temperature sensor that measures a temperature value and uses the measured temperature value as the predetermined or measured values.

18. An arrangement for angular measurement as claimed in claim 10, wherein a signal representing the angle sensor is used by the signal processing device as the predetermined or measured values.

19. An arrangement for angular measurement as claimed in claim 18, wherein the signal-processing device conducts a plausibility test of the sensor signals supplied by the angle sensor based on the reliability class information.

20. An arrangement for angular measurement as claimed in claim 10, wherein the graded limit values fix a plurality of ranges of values for the deviation.

* * * * *